Patented Apr. 21, 1953

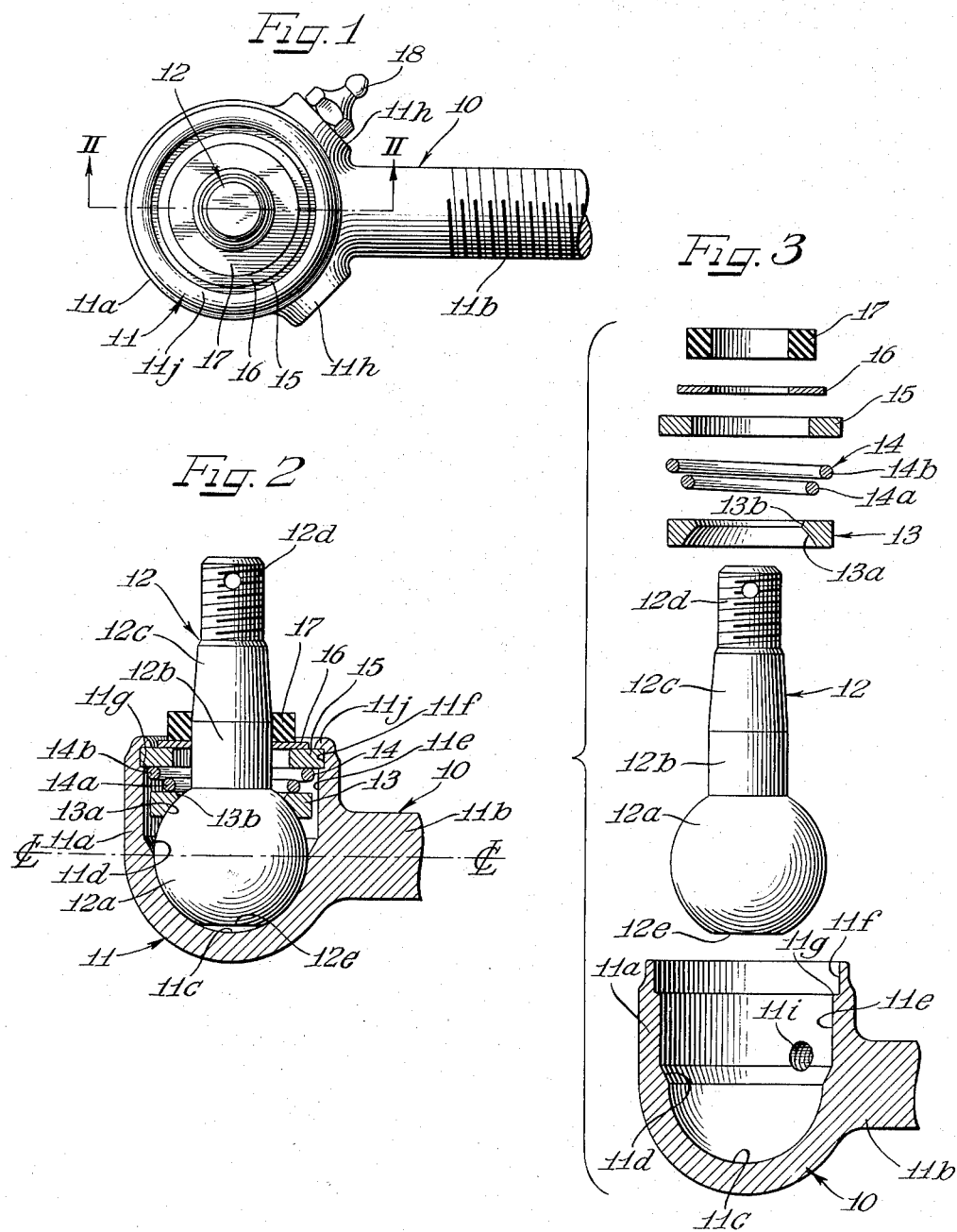

2,635,906

UNITED STATES PATENT OFFICE 2,635,906

BALL JOINT

Matthew P. Graham, Grosse Pointe, and Marshall H. Alldredge, Detroit, Mich., assignors to Thompson Products, Inc., Cleveland, Ohio, a corporation of Ohio Application July 21, 1949, Serial No. 105,992

4 Claims. (Cl. 287—90)

This invention relates to a ball and socket joint especially useful in steering linkages for automotive vehicles such as, for example, tie rod ends or the like. Particularly, the invention deals with a ball and socket joint having the socket thereof equipped with a closed fragmental spherical end for receiving the ball end of a stud and wherein the other end of the socket receives a closure washer through which freely extends the shank of the ball stud.

The conventional ball and socket joint has a limited bearing area because the shank of the ball stud extends through an opening in the bearing wall of the socket. The present invention now provides a ball joint with an increased bearing area by eliminating the hole or opening in the socket bearing wall.

According to the invention, the ball socket is equipped with a closed end that defines a continuous fragmental spherical internal bearing wall. The other end of the socket is open. The ball end of a ball stud rides on the fragmental spherical bearing wall of the socket and is held thereagainst by a spring-urged bearing ring surrounding a portion of the ball end of the stud adjacent the stud shank. The stud shank projects freely through a closure washer which is spun into or otherwise locked to the open end of the socket.

The socket is preferably equipped with a laterally extending stem or shank for attachment to a tie rod or other link member.

A feature of the invention resides in the alignment of the center of the ball head of the stud with the longitudinal center of the stem of the socket or housing for eliminating bending moments which might otherwise occur if the stud is located off of the stem center line.

Another feature of the invention resides in the provision of a free lubricant passage around the ball head of the stud that can automatically relieve excess lubricant pressure without requiring expensive additional components.

It is, then, an object of this invention to provide a joint assembly of enhanced bearing area.

A further object of the invention is to provide a ball and socket joint with a socket having a closed end forming an internal segmental spherical bearing wall of increased bearing area.

A still further object of the invention is to provide a ball and socket joint whose components are assembled in a non-conventional manner by utilizing a closure washer for the duel purpose of retaining the components in position and at the same time receiving a joint member freely therethrough for articulate movement therein.

Another and specific object of this invention is to provide a ball and socket joint assembly wherein excessive lubricant pressure can be readily relieved without the use of additional pressure relief means.

A further specific object of the invention is to provide a ball and socket joint wherein a cup-shaped housing has a segmental spherical bearing wall at the closed end thereof and receives the ball end of a ball stud in greater bearing area contact than in the conventional ball and socket joint and wherein a spring-urged bearing ring holds the ball end of the ball stud against the bearing wall while being freely disposed in the socket.

Other and further objects of this invention will become apparent to those skilled in the art from the following detailed description of the annexed sheet of drawings which, by way of a preferred example only, illustrates one embodiment of the invention.

On the drawings:

Figure 1 is a fragmentary plan view of a ball and socket joint according to this invention;

Figure 2 is a vertical cross-sectional view, with a part in elevation, taken along the line II—II of Figure 1 and illustrating the joint components in their assembled relationship; and Figure 3 is an exploded vertical cross-sectional view, with a part in elevation, of the parts of the joint illustrating the manner in which these parts are assembled to produce the joint.

As shown on the drawings:

The joint assembly 10, illustrated in Figures 1 and 2, is composed of a housing or socket 11, a ball stud 12, a bearing ring 13, a spring 14, and a closure washer 15. The joint assembly is preferably equipped with a seal composed of a metal washer 16 and a rubber washer or ring 17 disposed around the shank of the stud.

The socket or housing 11 has a cup-shaped main body portion 11a with a laterally extending externally threaded stem 11b for attachment to a tie rod or other link member. The main body 11a has a closed rounded end defining an internal semi-spherical bearing wall 11c. This bearing wall has its great circle or major diameter portion terminating in alignment with the longitudinal center line of the stem 11b and the internal wall then extends outwardly from this major diameter to provide a tapered wall 11d in the socket. The tapered wall 11d diverges to a cylindrical wall 11e which has a countersunk cylindrical portion 11f at the open end of the socket. A shoulder 11g is formed between the end of the wall 11e and the countersunk portion 11f.

The cup-like body 11a has a pair of lugs or protuberances 11h—11h on the side wall thereof adjacent each side of the stem 11b as shown in Figure 1. These protuberances are symmetrical and one of them has a lubricant hole 11i drilled therethrough to communicate with the interior of the socket as shown in Figure 3. A lubricant fitting 18 (Figure 1) is threaded into the drilled out protuberance 11h. Only one protuberance 11h is equipped with the lubricant hole but the provision of two such protuberances renders the unit symmetrical and makes possible selective positioning for the lubricant fitting 18.

The ball stud 12 has a full ball end 12a, a cylindrical shank portion 12b extending from the ball end 12a, a tapered shank portion 12c extending from the cylindrical portion 12b, and a threaded cylindrical portion 12d extending from the small end of the tapered portion 12c. The ball end, if desired, may have a flat spot 12e on the free end thereof. This ball end 12a rides on the spherical bearing wall 11c of the housing in full area bearing engagement therewith. The center of the ball end 12a is aligned with the major diameter or great circle portion of the bearing wall 11c so that the longitudinal center line of the stem 12b, when extended, will pass through the center of the ball head and any bending moments caused by misalignment of these centers will be eliminated.

The portion of the ball end 12a adjacent the stud shank portion 12b extends freely into the chamber defined by the tapered wall 11d and the cylindrical wall 11e of the socket.

The bearing ring 13 sits freely in the socket and has an outer diameter smaller than the diameter of the cylindrical socket portion 11e. The inner periphery of the bearing ring has a fragmental spherical bearing wall 13a converging to an outwardly flaring circular hole 13b.

The spring 14 freely surrounds the shank portion 12b of the stud and has a small diameter end coil 14a bottomed on the end face of the ring 13 while a large diameter opposite end coil 14b is bottomed on the under face of the closure washer 15. The spring thus urges the bearing ring to maintain the bearing wall 13a thereof against the ball end 12a of the stud.

The closure washer 15 is seated in the counterbore 11f against the shoulder 11g and is held in assembled relation in the open end of the socket by spinning or peening over the rim end portion of the socket as at 11j. This washer 15 receives the shank portion 12b of the stud freely therethrough so that the stud can tilt or rotate relative to the housing. The seal washer 16 fits rather snugly around the shank portion 12b and slides on the closure washer 15. It is maintained thereon by the rubber washer 17 which hugs the stud shank and can be loaded by an eye member (not shown) or the like link unit wedged on the tapered portion 12c of the stud in the customary manner.

As will be evident from Figure 3 the components of the joint of this invention are easily assembled by dropping the ball end 12a of the stud 12 into the socket 11 to rest on the bearing wall 11c thereof. The bearing ring 13 is then easily dropped around the stud shank 12b to rest on the adjacent portion of the ball end. The spring 14 is then easily dropped around the shank so that the small end coil 14a will rest on the bearing ring 13. The closure washer 15 is then inserted in the counterbore 11f and bottomed against the shoulder 11g whereupon the rim of the housing is spun over the washer to clamp it in the counterbore against the shoulder. Of course, the seal washers or rings 16 and 17 are easily disposed around the projecting end of the stud shank.

The assembled joint has the ball end of the ball stud held in contact with the hemispherical seat formed in the closed end of the socket and an enhanced contact bearing area is thereby obtained. This contact is made snug by the spring 14 which acts through the bearing ring 13 on the ball end of the stud. Lubricant inserted through the lubricant passageway 11i can flow freely around the ball stud and its passage is unimpeded by the bearing washer 13. The flat spot 12e on the ball end provides a lubricant chamber. In the event that if excessive lubricant pressures are developed by high pressure feeding through the fitting 18, such excessive pressures are easily relieved since the washer 16 will be deflected off of the closure washer 15 thereby accommodating escape of the excess lubricant.

From the above descriptions, it should be understood that the invention provides a ball and socket joint whose components are assembled in an unusual manner and provide an increased bearing area without enlargement of any of the parts or impeding escape of excess lubricant. It will, of course, be understood that modifications and variations may be effected without departing from the scope of the novel concepts of the invention.

We claim as our invention:

1. A ball and socket joint comprising a cup-shaped housing having a fragmental spherical internal bearing wall at its closed end, a ball stud having a ball end in bearing engagement on said bearing wall together with a shank extending from the ball end freely through the open end of the cup-shaped housing, said ball end having a flat spot providing a lubricant reservoir between the flat spot and the opposed surface of the housing bearing wall, a bearing ring surrounding the ball end of the stud adjacent the shank thereof and disposed freely in said housing, a closure washer secured in the open end of the housing receiving said shank therethrough, a spring compressed between the closure washer and the bearing ring for maintaining the bearing ring against the ball end of the stud and for urging the ball end of the stud against the bearing wall of the housing, said housing having a passage for introduction of lubricant thereinto, a metal washer snugly surrounding the shank portion of the stud and bottomed on the outer face of the closure washer, and a resiliently yieldable sealing washer snugly surrounding the stud shank and bottomed on the metal washer for maintaining the metal washer against the closure washer, whereby said metal washer and said sealing washer coact for relieving excess lubricant pressure through the open end of the housing.

2. A ball and socket joint comprising a cup-shaped housing having a semi-spherical bearing wall at the closed end thereof and a laterally extending stem, a ball stud having the ball end thereof in said cup-shaped housing, said housing having a cylindrical lubricant reservoir portion of at least as great a diameter as the diameter of said semi-spherical bearing wall, a bearing ring disposed freely in said housing and around said shank of the ball stud, a spring urging said bearing ring against the ball end of the stud to hold the ball end against the bearing wall of the housing, a closure washer for the open end of the cup-shaped housing receiving the shank of a stud freely therethrough and supporting the other end of said spring, a pressure relief valve comprising a sealing washer resiliently biased against the outer surface of said closure washer, said ball stud having a flat spot at its ball end cooperating with said bearing wall to form a secondary grease reservoir.

3. A joint assembly comprising a housing with a closed end defining a bearing wall and an open opposite end, a stud member having a head bottomed on the bearing wall of the closed end of the housing and a shank extending clearly through the open end of the housing, a closure ring anchored in the open end of the housing to retain the stud head in the housing, a bearing ring of substantially trapezoidal cross section surrounding the stud head adjacent the closure ring, and having a radially inward surface in conforming contact with said stud head, a spring between the rings urging the bearing ring against the stud head and the stud head against the bearing wall, a grease seal comprising a metal washer seated on the outer side of said closure ring and a resilient washer seated on the other side of said metal washer and snugly surrounding said stud member for sealing and biasing coaction with said metal washer and said stud member to provide a grease reservoir pressure relief valve.

4. A joint assembly comprising a housing having a closed end defining an internal bearing wall and an open opposite end, a lubricant inlet passageway into said housing between the closed and open ends thereof, a stud having a head riding on the bearing wall of the closed end of the housing, a closure ring secured in the open end of the housing, a bearing ring surrounding the stud head and freely disposed in the housing, spring means acting between the bearing ring and the closure ring for holding the stud head against the bearing wall of the housing, a seal closing the open end of the housing and yieldable means maintaining said seal in sealing engagement with the outer surface of said closure ring whereby excess pressure from lubricant introduced through the lubricant passageway will be relieved through said seal.

MATTHEW P. GRAHAM.
MARSHALL H. ALLDREDGE.

References Cited in the file of this patent

UNITED STATES PATENTS

| Number | Name | Date |
|---|---|---|
| 1,646,288 | Graham | Oct. 18, 1927 |
| 2,206,972 | Niles | July 9, 1940 |
| 2,274,420 | Katcher | Feb. 24, 1942 |
| 2,516,688 | Flumerfelt | July 25, 1950 |
| 2,553,743 | Booth | May 22, 1951 |

FOREIGN PATENTS

| Number | Country | Date |
|---|---|---|
| 419,185 | France | Dec. 28, 1910 |
| 423,716 | Great Britain | Feb. 6, 1935 |